(12) United States Patent
Sakaguchi

(10) Patent No.: US 9,623,712 B2
(45) Date of Patent: Apr. 18, 2017

(54) VEHICLE FRONT STRUCTURE FOR VEHICLE

(71) Applicant: TOYOTA JIDOSHA KABUSHIKI KAISHA, Toyota-shi (JP)

(72) Inventor: Shinichi Sakaguchi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/024,450

(22) PCT Filed: Sep. 25, 2014

(86) PCT No.: PCT/IB2014/001921
§ 371 (c)(1),
(2) Date: Mar. 24, 2016

(87) PCT Pub. No.: WO2015/044753
PCT Pub. Date: Apr. 2, 2015

(65) Prior Publication Data
US 2016/0236529 A1 Aug. 18, 2016

(30) Foreign Application Priority Data

Sep. 27, 2013 (JP) ................................. 2013-201452

(51) Int. Cl.
*B60G 3/04* (2006.01)
*B60G 7/00* (2006.01)
*B60G 7/02* (2006.01)

(52) U.S. Cl.
CPC .............. *B60G 7/001* (2013.01); *B60G 7/02* (2013.01); *B60G 2204/143* (2013.01); *B60G 2206/016* (2013.01)

(58) Field of Classification Search
CPC B60G 3/20; B60G 2200/144; B60G 2300/13; Y10T 29/49622
(Continued)

(56) References Cited

U.S. PATENT DOCUMENTS 5,306,034 A * 4/1994 Buchanan ................ B60G 3/20
280/124.135
5,348,337 A * 9/1994 Ando ...................... B60G 3/265
280/124.135
(Continued)

FOREIGN PATENT DOCUMENTS

JP 2004-009893 A 1/2004
JP 2012-158200 A 8/2012

OTHER PUBLICATIONS

International Search Report issued on Jan. 26, 2015 for PCT/IB2014/001921 filed on Sep. 25, 2014.

*Primary Examiner* — Toan To
(74) *Attorney, Agent, or Firm* — Oblon, McClelland, Maier & Neustadt, L.L.P.

(57) ABSTRACT

A vehicle front structure for a vehicle includes: a suspension member integrally assembled to a vehicle body; a first arm member that connects the suspension member to a wheel assembly; and a second arm member that connects the suspension member to the first arm member. The vehicle front structure includes a projection portion placed between a connection portion for the first arm member and a connection portion for the second arm member in a side rail constituting the suspension member and configured to abut with the second arm member deformed due to an input along with a collision caused in a front portion of the vehicle.

15 Claims, 6 Drawing Sheets

(58) Field of Classification Search
USPC ............... 280/124.133, 124.134, 124.135
See application file for complete search history.

(56) References Cited

U.S. PATENT DOCUMENTS

| | | | | |
|---|---|---|---|---|
| 5,516,130 | A * | 5/1996 | Mitchell | B60G 3/20 280/124.134 |
| 5,782,484 | A * | 7/1998 | Kuhn, Jr. | B60G 3/265 267/248 |
| 5,938,219 | A * | 8/1999 | Hayami | B60G 3/20 280/124.135 |
| 6,467,783 | B1 * | 10/2002 | Blondelet | B60G 3/20 280/124.106 |
| 8,662,510 | B2 * | 3/2014 | Christensen | B60G 3/26 280/124.134 |
| 2011/0025012 | A1 * | 2/2011 | Nakamura | B60G 3/20 280/124.135 |
| 2011/0298192 | A1 * | 12/2011 | Yu | B60G 7/001 280/124.134 |
| 2012/0018973 | A1 * | 1/2012 | Fujii | B60G 3/20 280/124.134 |
| 2013/0087397 | A1 * | 4/2013 | Yamamoto | B60G 3/20 180/68.4 |
| 2014/0361507 | A1 * | 12/2014 | Park | B60G 7/001 280/124.134 |
| 2015/0001826 | A1 * | 1/2015 | Hosoi | B60G 7/001 280/124.134 |

* cited by examiner

VEHICLE FRONT STRUCTURE FOR VEHICLE

BACKGROUND OF THE INVENTION

1. Field of the Invention

The present invention relates to a vehicle front structure for a vehicle.

2. Description of Related Art

There has been known a vehicle front structure as described in Japanese Patent Application Publication No. 2004-9893 (JP 2004-9893 A), for example. In the vehicle front structure of this related art, guide means that causes a front wheel to deviate outwardly and move backward against a collision load is provided between a subframe and a suspension arm connected to a lower side of a front side member, so that the front wheel thus moving backward interferes with interference means provided in a vehicle-body member, thereby transmitting a collision energy to the vehicle-body member via the front wheel so as to disperse the collision energy.

In the vehicle front structure of JP 2004-9893 A, when a collision occurs in a vehicle front portion, the front wheel is moved backward while deviating outwardly, that is, the front wheel is moved backward while being distanced outwardly in a vehicle width direction. This configuration is quite effective because the configuration allows the front wheel thus moved backward along with the collision with a collision object to abut with the vehicle-body member (a rocker formed in the vehicle body), thereby consequently making it possible to largely reduce such a danger that the front wheel penetrates into a passenger compartment. Particularly, at the time of such a collision type in which a collision object collides with that part of a vehicle front portion which is distanced from a longitudinal central axis of the vehicle, that is, at the time of a short overlap collision in which the vehicle front portion collides with the collision object with a small overlap (overlap amount), the front wheel is surely distanced outwardly in the vehicle width direction and moved backward so that the front wheel thus moved backward abuts with the rocker, thereby consequently making it possible to largely reduce such a danger that the front wheel penetrates into the passenger compartment. In view of this, the above configuration is effective.

In the meantime, at the time when a collision occurs in the vehicle front portion, in order to immediately cause the front wheel to be distanced outwardly in the vehicle width direction and to move backward (in order to cause the front wheel to deviate outwardly and move backward), the following points are most important: that part of a connection portion between the subframe and the suspension member which is placed on a front side in a vehicle front-rear direction should be detached from the subframe at an early stage; and a deformation amount of the suspension arm with respect to an input along with the collision should be restrained. However, in a case where the connection portion between the subframe and the suspension arm is formed by use of a bush, it is necessary for the bush to be easily separated from the suspension arm so that the suspension arm is detached from the subframe at an early stage. In other words, it is necessary to lower strength and rigidity of the connection portion. On the other hand, it is also necessary to secure strength and rigidity necessary for the vehicle to run on a rough road, for example. However, it is difficult to satisfy both of these requirements incompatible with each other. Further, in order to restrain a deformation amount of the suspension arm with respect to an input along with a collision, it is necessary to reinforce the suspension arm itself by adding a reinforcing plate or by performing manufacture by iron forging. This results in an increase of unspring weight and an increase of manufacturing cost.

SUMMARY OF THE INVENTION

The present invention provides a vehicle front structure for a vehicle in which a front wheel is distanced outwardly in a vehicle width direction and is moved backward more immediately with a simple structure.

A vehicle front structure for a vehicle according to one aspect of the present invention includes: a vehicle-body side member, a first arm member, and a second arm member.

The vehicle-body side member is integrally assembled to a vehicle body of the vehicle. The first arm member and the second arm member are connected to the vehicle-body side member so as to support a wheel assembly of the vehicle. In this case, the second arm member can be configured to be connected to the vehicle-body side member and also connected to the first arm member. Further, in this case, the vehicle-body side member employed herein is more specifically a front side member constituting the vehicle body or a suspension member integrally adhered to the front side member so as to support a suspension including the first arm member and the second arm member.

The vehicle front structure for the vehicle includes a front-side connection portion that is either one of a connection portion connecting the first arm member to the vehicle-body side member and a connection portion connecting the second arm member to the vehicle-body side member.

The vehicle front structure for the vehicle includes a rear-side connection portion that is the other one of the connection portion for the first arm member and the connection portion for the second arm member, the rear-side connection portion being placed on a rear side in a vehicle front-rear direction relative to the front-side connection portion.

The vehicle front structure for the vehicle includes an abutment member. The abutment member being placed on a rear side, in the vehicle front-rear direction, relative to the front-side connection portion, the abutment member is placed on the front side, in the vehicle front-rear direction, relative to the rear-side connection portion. When the abutment member abuts with the vehicle-body side member and at least one of the first arm member and the second arm member which is deformed or moved backward in the vehicle front-rear direction due to an input from the wheel assembly along with a collision caused in a front portion of the vehicle, the abutment member detaches the front-side connection portion. Note that, in this case, the abutment member is more specifically being placed on the rear side, in the vehicle front-rear direction, relative to the front-side connection portion, the abutment member is placed on the front side, in the vehicle front-rear direction, relative to the rear-side connection portion. The abutment member includes a projection portion provided in at least one of the first arm member, the second arm member, and the vehicle-body side member, and when the abutment member abuts with the vehicle-body side member and at least one of the first arm member and the second arm member, the projection portion detaches the front-side connection portion. Further, at least one of the first arm member, the second arm member, and the vehicle-body side member is opposed to the projection portion at the same height in the vehicle up-down direction so as to abut with the projection portion.

According to the configuration, it is possible to place the abutment member (the projection portion) on the rear side relative to the front-side connection portion and on the front side relative to the rear-side connection portion in the vehicle front-rear direction, that is, it is possible to place the abutment member (the projection portion) in a space surrounded by the first arm member, the second arm member, and the vehicle-body side member (the front side member or the suspension member). Hereby, when at least one of the first arm member and the second arm member is deformed or moved backward due to an input from the wheel assembly along with a collision caused in the front portion of the vehicle, the first arm member and/or the second arm member thus deformed or moved backward and the vehicle-body side member can surely abut with the abutment member (the projection portion) placed in the space in a sandwiched manner.

In the meantime, since the abutment member (the projection portion) is placed on the rear side relative to the front-side connection portion and on the front side relative to the rear-side connection portion, when the first arm member and/or the second arm member thus deformed or moved backward abuts with the abutment member, the abutment member serves as a fulcrum of the first arm member and/or the second arm member with respect to the vehicle-body side member. In this case, a fulcrum distance (hereinafter referred to as the fulcrum distance before collision) with respect to the vehicle-body side member before the abutment (that is, before collision) is determined by the front-side connection portion and the rear-side connection portion, whereas a fulcrum distance (hereinafter referred to as the fulcrum distance after collision) with respect to the vehicle-body side member after the abutment (that is, after collision) is determined by the front-side connection portion and the abutment member. Since the fulcrum distance after collision is shorter than the fulcrum distance before collision, it is possible to increase an input caused due to an input along with the collision and applied outwardly to the front-side connection portion in the vehicle width direction.

Thus, the input applied outwardly in the vehicle width direction can be increased, thereby making it possible to preferentially separate the front-side connection portion from the vehicle-body side member due to the input along with the collision. Accordingly, in terms of rigidity or strength of the connection portion of the first arm member placed on the front side in the vehicle front-rear direction, or in terms of rigidity or strength the connection portion of the second arm member placed on the front side in the vehicle front-rear direction, the following can be said. That is, even if a strength and a rigidity necessary for the vehicle to run on a rough road are secured, it is possible to increase the input caused due to the input along with the collision and applied outwardly in the vehicle width direction, thereby making it possible to surely detach the front-side connection portion at the time of the occurrence of the collision. Hereby, at the time when a collision occurs in the front portion of the vehicle, it is possible to immediately cause the front wheel to be distanced outwardly in the vehicle width direction and to move backward (to cause the front wheel to deviate outwardly and move backward). That is, by providing the abutment member, it is possible to satisfy the following incompatible requirements: to sufficiently secure the strength and rigidity of the front-side connection portion; and to surely separate the front-side connection portion as necessary.

Further, in this case, it is possible to place the abutment member (the projection portion) on the rear side relative to the front-side connection portion and on the front side relative to the rear-side connection portion, so that the abutment member (the projection portion) is placed in such a part in which the first arm member and/or the second arm member is easily (first) deformed due to the input from the wheel assembly along with the collision caused in the front portion of the vehicle. That is, it is possible to place the abutment member (the projection portion) in a weakest part and its vicinal area, which weakest part is a part where a resistance with respect to the deformation is smaller than that in the other parts. Hereby, even if the first arm member and/or the second arm member is deformed due to the input along with the collision, it is possible to effectively restrain a deformation amount thereof by abutting with the abutment member (the projection portion). Accordingly, it is possible to restrain the deformation amount of the first arm member and the second arm member without adding a reinforcing plate or performing manufacture by iron forging. Since the deformation amount of the first arm member and/or the second arm member can be restrained effectively as such, it is possible to distance the wheel assembly outwardly in the vehicle width direction.

In view of this, according to the vehicle front structure for the vehicle, when a collision occurs in a vehicle front portion, it is possible to move the wheel assembly (the front wheel) backward by surely distancing the wheel assembly (the front wheel) outwardly in the vehicle width direction. Hereby, particularly at the time of a short overlap collision, even in a state where the wheel assembly (the front wheel) is moved backward vigorously along with the collision with a collision object, the wheel assembly (the front wheel) thus moved backward can abut with, for example, a rigid rocker constituting the vehicle body, thereby making it possible to largely reduce such a danger that the wheel assembly penetrates into a passenger compartment, which is a vehicle body portion. This makes it possible to protect an occupant appropriately.

In this case, the abutment member can be a projection portion formed integrally with at least one of the first arm member, the second arm member, and the vehicle-body side member. Further, in this case, the vehicle-body side member and at least one of the first arm member and the second arm member can abut with the abutment member at the same height in the vehicle up-down direction. According to the configuration, it is not necessary to secure a mounting space separately, and it is possible to provide the abutment member in an extremely easy and low-cost manner.

Further, in this case, the abutment member can be integrally assembled to that part of the vehicle body which is placed between the vehicle-body side member and at least one of the first arm member and the second arm member, so that the abutment member can be provided to be sandwiched between the vehicle-body side member and the at least one of the first arm member and the second arm member. Also in this case, the vehicle-body side member and at least one of the first arm member and the second arm member can abut with the abutment member at the same height in the vehicle up-down direction. Even according to the configuration, it is not necessary to secure a mounting space separately, and it is possible to provide the abutment member in an extremely easy and low-cost manner.

Further, in this case, when at least one of the first arm member and the second arm member is deformed or moved backward in the vehicle front-rear direction due to the input from the wheel assembly along with the collision caused in the front portion of the vehicle, the projection portion can abut with at least one of the first arm member and the second arm member which is not detached from the vehicle-body side member, an outward input to the first arm member and the second arm member can be larger than a removal load, the removal load detaching the first arm member or the second arm member from the vehicle-body side member at the front-side connection portion, the outward input being caused outwardly in the vehicle width direction due to the input from the wheel assembly, and the abutment member can increase the outward input. Further, in this case, before the wheel assembly abuts with a vehicle body portion placed behind the wheel assembly in the vehicle front-rear direction, the abutment member can increase the outward input so that the outward input becomes larger the removal load, and the abutment member can cause the first arm member or the second arm member to be detached from the vehicle-body side member at the front-side connection portion. In terms of the outward input, when an input from the wheel assembly along with the collision caused in the front portion of the vehicle is assumed F, a rigidity of the front-side connection portion with respect to the input F is assumed K1, a rigidity of the rear-side connection portion with respect to the input F is assumed K2, a rigidity of the abutment member with respect to the input F is assumed K3, a distance between the front-side connection portion and the rear-side connection portion is assumed L, and a distance between the front-side connection portion and the abutment member is assumed L', an outward input f1 can be represented by the following formula: $f1=(K1\times(L\times K2+L'\times K3)\times W\times F)/((L-L')^2\times K2\times K3+L'^2\times K1\times K3+L^2\times K1\times K2))$.

According to the configuration, in a state where at least one of the first arm member and the second arm member is deformed or moved backward but the first arm member and the second arm member are not detached from the vehicle-body side member yet, when at least one of the first arm member and the second arm member abuts with the abutment member, the distance L' between the front-side connection portion and the abutment member, as a fulcrum distance after collision, becomes shorter than the distance L between the front-side connection portion and the rear-side connection portion, as a fulcrum distance before collision. Accordingly, as apparent from the above formula, the outward input caused due to the input along with the collision and applied outwardly to the first arm member and the second arm member in the vehicle width direction can be increased efficiently so as to become larger than the removal load to detach the front-side connection portion from the vehicle-body side member. Note that, the removal load can be determined based on a necessary strength and a necessary rigidity for the vehicle to run on a rough road, for example.

This makes it possible for the abutment member to apply, to the front-side connection portion, the outward input increased so as to become larger than the removal load, thereby resulting in that the front-side connection portion can be detached surely at an early stage before the wheel assembly moving backward at the time of the occurrence of the collision abuts with the passenger compartment (more specifically, a member constituting the passenger compartment), which is the vehicle body portion. Hereby, at the time when a collision occurs in the front portion of the vehicle, it is possible to immediately cause the front wheel to be distanced outwardly in the vehicle width direction and to move backward (to cause the front wheel to deviate outwardly and move backward). Thus, when a collision occurs in the front portion of the vehicle, it is possible to move the Wheel assembly (the front wheel) backward by surely distancing the wheel assembly (the front wheel) outwardly in the vehicle width direction. Hereby, particularly at the time of a short overlap collision, even in a state where the wheel assembly (the front wheel) is moved backward along with the collision with a collision object, the wheel assembly (the front wheel) thus moved backward can abut with, for example, a rigid rocker constituting the vehicle body, thereby making it possible to largely reduce such a danger that the wheel assembly penetrates into the passenger compartment, which is the vehicle body portion. This makes it possible to protect the occupant appropriately.

In these cases, when the abutment member increases the outward input so that the outward input becomes larger than the removal load and the first arm member or the second arm member is detached from the vehicle-body side member at the front-side connection portion due to the outward input, the abutment member can distance the wheel assembly outwardly in the vehicle width direction at least around the rear-side connection portion that is the other one of the connection portion for the first arm member and the connection portion for the second arm member and is placed on the rear side in the vehicle front-rear direction, and the abutment member can displace the wheel assembly toward the rear side in the vehicle front-rear direction. Further, in this case, the rear-side connection member may have a central axis along the vehicle front-rear direction, and the bush may allow the first arm member or the second arm member to be displaced in a rotating manner in the vehicle up-down direction around the central axis. More specifically, the rear-side connection member may include a bush.

According to the configuration, at the time when a collision occurs in the front portion of the vehicle, it is possible to immediately cause the front wheel to be distanced outwardly in the vehicle width direction and to move backward (to cause the front wheel to deviate outwardly and move backward) without causing the wheel assembly to come off the vehicle, so that the wheel assembly (the front wheel) can abut with, for example, a rigid rocker constituting the vehicle body, thereby making it possible to largely reduce such a danger that the wheel assembly penetrates into the passenger compartment, which is the vehicle body portion. This makes it possible to protect the occupant appropriately, and to effectively prevent occurrence of such a secondary damage that the wheel assembly coming off the vehicle collides with another vehicle.

In these cases, the removal load can be a load to detach the first arm member or the second arm member from a fixing member, the fixing member integrally fixed to the vehicle-body side member so as to constitute the front-side connection portion, the first arm member integrally adhered to the fixing member, the second arm member integrally adhered to the fixing member. In this case, more specifically, the fixing member can be a bush having a central axis along the vehicle front-rear direction and the bush allowing the first arm member or the second arm member to be displaced in a rotating manner in the vehicle up-down direction around the central axis, and the removal load can be a load to detach, from the bush integrally fixed to the vehicle-body side member, the first arm member or the second arm member integrally adhered to the bush.

According to the configuration, it is possible for the front-side connection portion to extremely easily secure a strength and a rigidity necessary for the vehicle to run on a rough road. Note that, in this case, the rear-side connection portion may have a strength and a rigidity larger than those of the front-side connection portion. Alternatively, the rear-side connection portion may easily displace the first arm member and the second arm member in a rotating manner around the central axis along the vehicle up-down direction.

Accordingly, it is possible satisfy the following incompatible requirements: to sufficiently secure the strength and rigidity of the front-side connection portion; and to surely separate the front-side connection portion as necessary.

Further, in these cases, the abutment member can be provided in a position where at least one of the first arm member and the second arm member is deformed inwardly in the vehicle width direction along with the collision. Further, in this case, more specifically, the position where at least one of the first arm member and the second arm member is deformed inwardly in the vehicle width direction can be a position where a resistance against the deformation is smaller than that in the other parts.

According to the configuration, it is possible to place the abutment member along with a collision in that position in at least one of the first arm member and the second arm member in which the resistance against the deformation is smaller than that in the other parts, that is, it is possible to place the abutment member along with a collision in a weakest part (a weakest position) of at least one of the first arm member and the second arm member. Hereby, even if the first arm member and/or the second arm member is deformed along with the collision, it is possible to effectively restrain a deformation amount thereof by abutting with the abutment member. Accordingly, it is possible to restrain the deformation amount of the first arm member and the second arm member with an extremely simple structure at a low cost, without adding a reinforcing plate or performing manufacture by iron forging, for example. Since the deformation amount of the first arm member and/or the second arm member can be restrained effectively as such, it is possible to apply a large load outwardly in the vehicle width direction. Accordingly, it is possible to surely separate the first arm member from the connection portion or the second arm member from the connection portion at the time of the occurrence of the collision.

Accordingly, when a collision occurs in the front portion of the vehicle, it is possible to move the wheel assembly (the front wheel) backward by surely distancing the wheel assembly (the front wheel) outwardly in the vehicle width direction. Hereby, particularly at the time of a short overlap collision, even in a state where the wheel assembly (the front wheel) is moved backward along with the collision with a collision object, the wheel assembly (the front wheel) thus moved backward can abut with, for example, a rigid rocker constituting the vehicle body, thereby making it possible to largely reduce such a danger that the wheel assembly penetrates into the passenger compartment, which is the vehicle body portion. This makes it possible to protect the occupant appropriately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
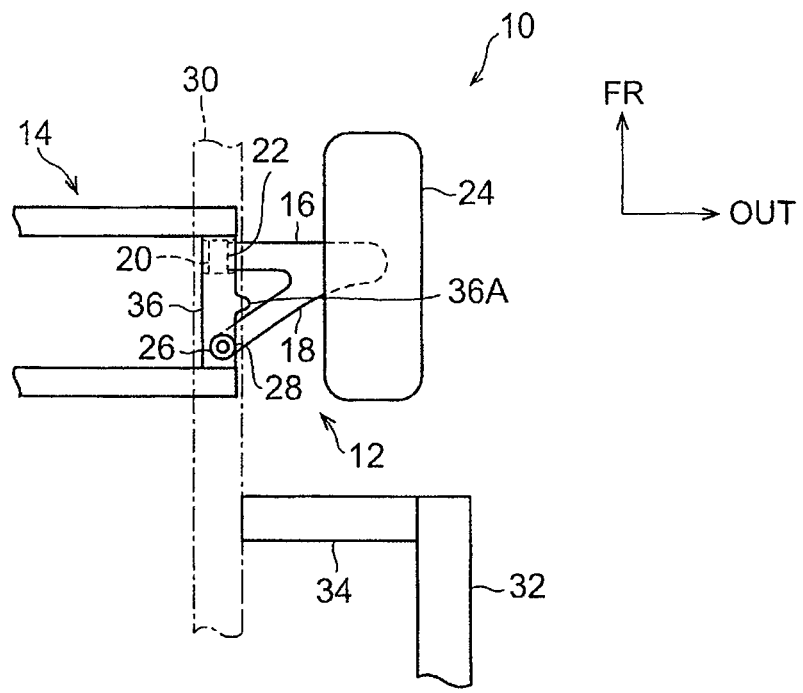
FIG. 1 is a schematic diagram illustrating a vehicle front structure according to an embodiment.

The following describes a vehicle front structure for a vehicle according to an embodiment of the present invention with reference to the drawings. FIG. 1 diagrammatically illustrates a vehicle front structure 10 for a vehicle according to the present embodiment. Note that an arrow FR, an arrow OUT, an arrow UP shown in each drawing used for the following description indicate a front side in a vehicle front-rear direction, an outer side in a vehicle width direction (a right-and-left direction), and an upper side in a vehicle up-down direction, respectively. Further, the vehicle front structure 10 for a vehicle is configured in a symmetrical manner, so that only a right side of the vehicle is illustrated in each drawing used for the following description.

As illustrated in FIG. 1, the vehicle front structure 10 for a vehicle includes a lower arm 12 constituting a suspension, and a suspension member 14 serving as a vehicle-body side member that supports the suspension. The lower arm 12 constitutes a front suspension of MacPherson type, and includes a first arm member 16 and a second arm member 18. In a state where the first arm member 16 and the second arm member 18 are connected to each other as described later, a connecting portion therebetween has a bending shape in which the connecting portion is placed outwardly in the vehicle width direction, and is extended in the vehicle front-rear direction.

Figure 2:
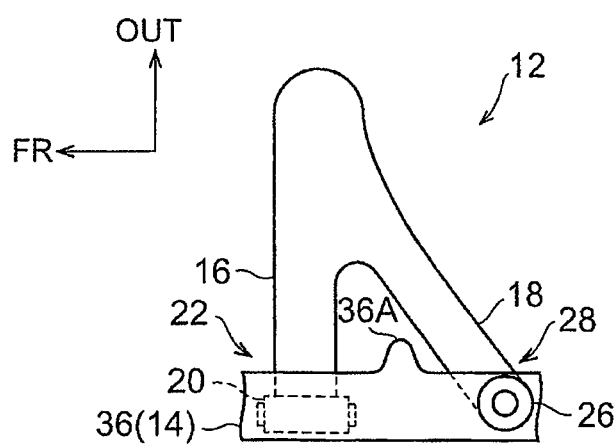
FIG. 2 is a schematic view to describe an assembling structure of a lower arm to a suspension member in FIG. 1.

The first arm member 16 in the present embodiment is placed on a front side relative to the second arm member 18 (a strut bar) in the vehicle front-rear direction, and is extended in the vehicle width direction. As illustrated in FIG. 2, the first arm member 16 is configured such that its inner end in the vehicle width direction is adhered, by welding or the like, integrally to a bush 20 serving as a fixing member having a central axis along the vehicle front-rear direction and assembled to the suspension member 14, for example. Hereby, in the present embodiment, the bush 20 forms a connection portion 22 as a front-side connection portion. Here, a removal load to be described later depends on a welding strength of the first arm member 16 with respect to the bush 20, and is determined based on a strength necessary for the vehicle to run on a rough road. Further, the first arm member 16 is configured such that its outer end in the vehicle width direction supports a wheel assembly 24 (a front wheel), as illustrated in FIG. 1. Accordingly, the first arm member 16 connects the suspension member 14 serving as the vehicle-body side member to the wheel assembly 24 (the front wheel).

As illustrated in FIGS. 1, 2, the second arm member 18 in the present embodiment is extended so as to bend generally in a curved shape that is curved from inside toward outside in the vehicle width direction, and is configured such that its outer end in the vehicle width direction is adhered (joined) integrally to a rear side of the first arm member 16 in the vehicle front-rear direction so that the second arm member 18 is connected to the first arm member 16. Further, the second arm member 18 is configured such that its inner end in the vehicle width direction is adhered, by welding or the like, integrally to a bush 26 having a central axis along the vehicle up-down direction and assembled to the suspension member 14. Hereby, in the present embodiment, the bush 26 forms a connection portion 28 as a rear-side connection portion. Accordingly, the second arm member 18 connects the suspension member 14 serving as the vehicle-body side member to the first arm member 16 so as to support the wheel assembly 24 (the front wheel).

Here, although not specifically illustrated herein, the bush 20 includes a central axis, or a cored bar, along the vehicle front-rear direction, and an outer cylinder that accommodates therein the cored bar and an elastic member (vulcanized rubber or the like). The bush 20 is configured such that both end portions of the cored bar are assembled by bolting or the like so that the bush 20 is fixed integrally to the suspension member 14 (more specifically, a suspension member side rail 36 to be specifically described later), and the first arm member 16 is adhered integrally to the outer cylinder by welding or the like. In the meantime, although not specifically illustrated herein, the bush 26 includes a central axis, or a cored bar, along the vehicle up-down direction, and an outer cylinder that accommodates therein the cored bar and an elastic member (vulcanized rubber or the like). The bush 26 is configured such that threaded portions formed in both end portions of the cored bar are assembled by nut fastening or the like so that the bush 26 is fixed integrally to the suspension member 14 (more specifically, the suspension member side rail 36 to be specifically described later), and the second arm member 18 is adhered integrally to the outer cylinder by welding or the like.

The suspension member 14 is formed in a frame shape in a plane view as illustrated in FIG. 1, and is integrally assembled to a pair of right and left front side members 30 extended in the vehicle front-rear direction so as to form a vehicle body. Note that the vehicle body is provided with: a rocker 32 placed parallel to the front side member 30 such that the rocker 32 is placed on an outer side relative to the front side member 30 in the vehicle width direction and on a rear side relative to the wheel assembly 24 (the front wheel); and a front torque box 34 that connects the front side member 30 to the rocker 32 and defines the passenger compartment.

The suspension member 14 includes a suspension member front and a suspension member rear, which are not illustrated in detail, and a pair of right and left suspension member side rails 36. Note that the suspension member front and the suspension member rear are extended in the vehicle width direction, and are placed side by side in the vehicle front-rear direction.

The suspension member side rail 36 is extended in the vehicle front-rear direction, so as to connect respective outer ends, in the vehicle width direction, of the suspension member front and the suspension member rear to each other, and hereby forms a side part of the suspension member 14. Further, as illustrated in FIGS. 1, 2, the first arm member 16 is connected to the suspension member side rail 36 via the connection portion 22 formed by including the bush 20, and the second arm member 18 is connected to the suspension member side rail 36 via the connection portion 28 formed by including the bush 26.

Further, as illustrated in FIG. 2 in a magnified manner, in the suspension member side rail 36 in the present embodiment, a projection portion 36A serving as an abutment member projecting outwardly in the vehicle width direction is formed on a vehicle width direction outer surface of the side rail 36, that is, on a surface thereof opposed to the lower arm 12 formed by including the first arm member 16 and the second arm member 18 connected each other. As illustrated in FIG. 2, the projection portion 36A is placed on the rear side relative to that connection portion 22 (the bush 20) of the first arm member 16 which serves as the front-side connection portion placed on the front side in the vehicle front-rear direction, and on the front side relative to that connection portion 28 (the bush 26) of the second arm member 18 which serves as the rear-side connection portion placed on the rear side in the vehicle front-rear direction. That is, the projection portion 36A is provided in a space surrounded by the first arm member 16, the second arm member 18, and the suspension member side rail 36.

As illustrated in FIG. 2, the projection portion 36A in the present embodiment is placed in vicinity to the connection portion 28 of the second arm member 18, and is set to have a projection amount (a height from the vehicle width direction outer surface) that allows the projection portion 36A to immediately abut with the second arm member 18 at the time when the second arm member 18 is deformed inwardly in the vehicle width direction due to an input from the wheel assembly 24 (the front wheel) along with a collision caused in a front portion of the vehicle. Further, in the present embodiment, an abutment position of the second arm member 18 which abuts with the projection portion 36A is set to the same height as the projection portion 36A in the vehicle up-down direction (more specifically, in a vertical direction). Hereby, when the second arm member 18 is deformed due to the input along with the occurrence of the collision, the projection portion 36A abuts with the second arm member 18 immediately, so that it is possible to restrain a deformation amount of the second arm member 18, as will be described later. Further, as will be described later, the projection portion 36A can increase that outward input to the first arm member 16 which occurs outwardly in the vehicle width direction due to the input along with the occurrence of the collision, that is, an outward input applied to the connection portion 22 of the first arm member 16 as the front-side connection portion so that the first arm member is separated from the bush 20. At this time, the projection portion 36A increases the outward input so that the outward input becomes larger than a removal load to detach the first arm member 16 from the bush 20.

Next will be described an operation/working-effect of the vehicle front structure 10 for a vehicle according to the present embodiment configured as described above.

For example, when a short overlap collision occurs in which either end of the front portion of the vehicle or its vicinal area in the vehicle width direction collides with a collision object with a small overlap (overlap amount), the wheel assembly 24 (the front wheel) is moved backward toward a vehicle rear side due to an input along with the collision. Along with the backward movement of the wheel assembly 24 (the front wheel), in the vehicle front structure 10 for a vehicle according to the present embodiment, that input along with the collision which is applied backward in the vehicle front-rear direction is transmitted to the first arm member 16 constituting the lower arm 12 from the wheel assembly 24 (the front wheel).

Thus, when the input along with the collision is transmitted to the first arm member 16, the input along with the collision is transmitted to the second arm member 18, because the first arm member 16 is connected to the suspension member 14 (the suspension member side rail 36) via the bush 20 at the connection portion 22. Here, the second arm member 18 is formed generally in a curved shape in which the second arm member 18 bends outwardly in the vehicle width direction, and is connected to the first arm member 16. Accordingly, the second arm member 18 is deformed (bent) inwardly in the vehicle width direction as illustrated by a continuous line in FIG. 3, as compared to a state where the second arm member 18 has not been deformed as illustrated by an alternate long and short dash line.

Figure 3:
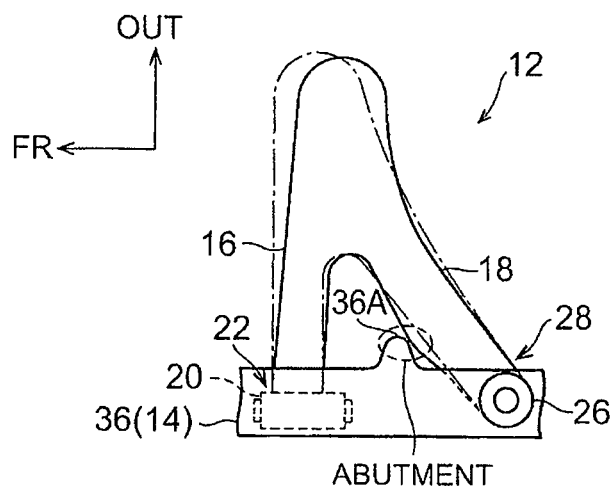
FIG. 3 is a view to describe an abutment state between the lower arm deformed due to an input along with a collision and a projection portion formed in the suspension member.

In the meantime, in the vehicle front structure 10 for a vehicle according to the present embodiment, the projection portion 36A projecting toward the second arm member 18 is formed in vicinity to the connection portion 28 of the second arm member 18. Accordingly, as described above, when the second arm member 18 starts deforming inwardly in the vehicle width direction, the second arm member 18 abuts with the projection portion 36A at an early stage of the deformation start as illustrated in FIG. 3, and a further deformation of the second arm member 18 is restrained. That is, the deformation amount of the second arm member 18 due to the input along with the collision is restrained appropriately.

Further, when the projection portion 36A abuts with the second arm member 18, it is possible to immediately and efficiently increase the outward input that detaches (separates) the first arm member 16 from the bush 20, at the connection portion 22 of the first arm member 16 as the front-side connection portion. The following describes this point more specifically.

First, in order to facilitate understanding, the following describes a case where no projection portion as an abutment member is provided in a suspension member side rail, such as a vehicle front structure for a vehicle according to a related art. Note that, in the following description, a target part has a reference sign obtained by adding "100" to the reference sign used in the vehicle front structure 10 for a vehicle according to the present embodiment, so as to correspond to the vehicle front structure 10 for a vehicle according to the present embodiment.

Figure 4:
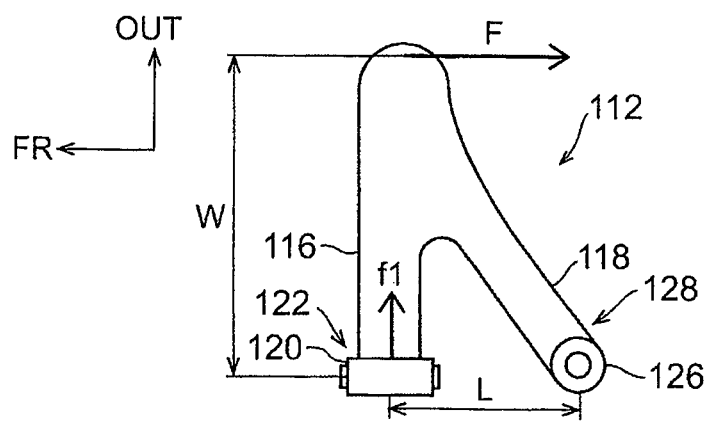
FIG. 4 is a view to describe an outward input to a first arm member in a normal vehicle front structure for a vehicle which does not include a projection portion serving as an abutment member.

In a vehicle front structure 110 for a vehicle in the related art, a distance from a connection portion 122 of a first arm member 116, namely, a point of load, to a point of effort to which an input along with a collision is transmitted is assumed W, and a distance from the connection portion 122 to a connection portion 128 of a second arm member 118, namely, a fulcrum, is assumed L, as diagrammatically illustrated in FIG. 4. In this case, when an input F along with a collision is caused in the point of effort, that outward input f1 applied to the first arm member 16 which is caused due to a force, namely, the input F applied outwardly in the vehicle width direction with respect to the point of load, namely, the connection portion 122 as the front-side connection portion can be represented by Formula 1 as follows:

$$f1 = \frac{W}{L} \times F \qquad \text{Formula 1}$$

In the meantime, in the vehicle front structure 10 for a vehicle according to the present embodiment described above, the projection portion 36A is provided between the connection portion 22 as the front-side connection portion and the connection portion 28 as the rear-side connection portion, as illustrated in FIG. 3, and the projection portion 36A can abut with the second arm member 18. That is in the vehicle front structure 10 for a vehicle according to the present embodiment, when the second arm member 18 is deformed inwardly in the vehicle width direction and abuts with the projection portion 36A, the projection portion 36A restrains the deformation of the second arm member 18 and works as a fulcrum, as diagrammatically illustrated in FIG. 5, thereby making it possible to increase that outward input f1' applied to the first arm member 16 which is caused due to an input along with a collision. Note that, in the following description, in order to distinguish from the case of the vehicle front structure 110 for a vehicle in the related art, an outward input in the vehicle front structure 10 for a vehicle according to the present embodiment is referred to as "outward input f1'." However, this indication is used for convenience to facilitate understanding of the following description, and it goes without saying that the "outward input f1'" can be expressed as "outward input f1" represented by Formula 2 described below.

Figure 5:
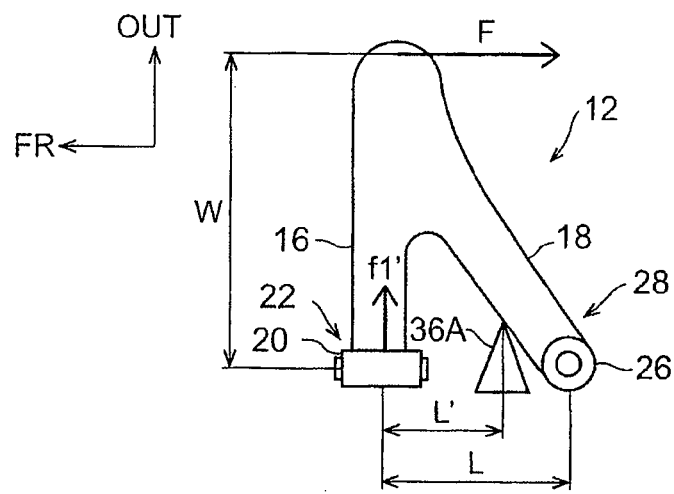
FIG. 5 is a view to describe an outward input to a first arm member in the vehicle front structure for a vehicle of FIG. 1.

More specifically, even in this case, similarly to the vehicle front structure 110 for a vehicle in the related art, a distance from the connection portion 22 of the first arm member 16, namely, a point of load, to a point of effort to which an input along with a collision is transmitted is assumed W, and a distance (a fulcrum distance before collision) from the connection portion 22 to the connection portion 28 of the second arm member 18, namely, a fulcrum before the collision, is assumed L, as illustrated in FIG. 5. Further, in this case, a distance (a fulcrum distance after collision) from the connection portion 22 to the projection portion 36A as the abutment member, namely, a fulcrum after the collision is assumed L', as illustrated in FIG. 5. Here, such a positional relationship is modelled dynamically as illustrated in FIG. 6, and described below more specifically.

Figure 6:
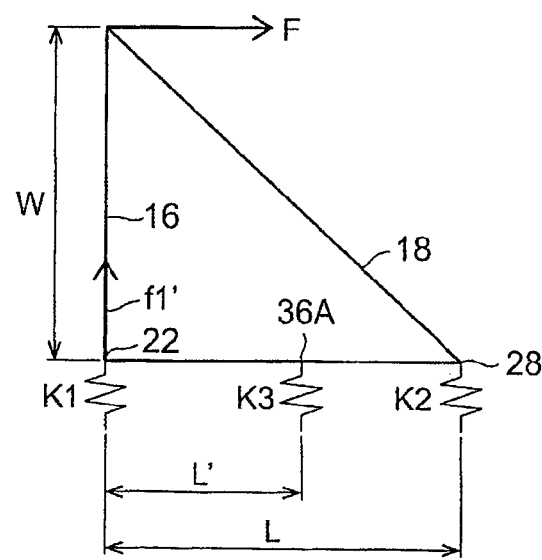
FIG. 6 is a view of a modelled relationship of FIG. 5.

Now, as illustrated in FIG. 6, a rigidity of the connection portion 22 with respect to that input F along with the collision which is applied in the vehicle front-rear direction is assumed K1, and a rigidity of the connection portion 28 with respect to the input F is assumed K2, and a rigidity of the projection portion 36A with respect to the input F is assumed K3. In this case, when the input F along with the collision is transmitted to the point of effort, the outward input f1' that is applied outwardly in the vehicle width direction with respect to the point of load, namely, the connection portion 22 as the front-side connection portion can be represented by Formula 2 as follows:

$$f1' = \frac{K1 \times (L \times K2 + L' \times K3) \times W}{(L-L')^2 \times K2 \times K3 + L'^2 \times K1 \times K3 + L^2 \times K1 \times K2} \times F \qquad \text{Formula 2}$$

Here, as described above, the bush 26 constituting the connection portion 28 has a central axis along the vehicle up-down direction and allows a rotational displacement of the second arm member 18 in the vehicle front-rear direction. In view of this, it can be considered that the rigidity K2 of the connection portion 28 with respect to that input F along with the collision which is applied in the vehicle front-rear direction is extremely small at least in comparison with the rigidity K1 and the rigidity K3 of the other portions. Accordingly, if a value of the rigidity K2 in Formula 2 is "0," the outward input f1' to the connection portion 22 can be represented by Formula 3 as follows:

$$f1' = \frac{W}{L'} \times F \qquad \text{Formula 3}$$

In the meantime, in the vehicle front structure 10 for a vehicle according to the present embodiment, the projection portion 36A formed in the suspension member 14 (more specifically, the suspension member side rail 36), which is a vehicle-body side member, can be placed between the connection portion 22 (the bush 20) and the connection portion 28 (the bush 26). Hereby, in the vehicle front structure 10 for a vehicle according to the present embodiment, it is possible to shorten the fulcrum distance L' after collision, as compared to the fulcrum distance L before collision, as illustrated in FIGS. 5 and 6. In view of this, as apparent from Formula 1 and Formula 3, in the vehicle front structure 10 for a vehicle according to the present embodiment, when the second arm member 18 abuts with the projection portion 36A before detachment of the first arm member 16 starts at the connection portion 22 as the front-side connection portion, it is possible to increase the outward input f1' after the collision according to a ratio of (L/L') so that the outward input f1' becomes larger than the outward input f1 before the collision. Hereby, in a state where the input F along with the collision is transmitted to the point of effort when the collision occurs, the projection portion 36A is able to increase the outward input f1' to the first arm member 16 (that is, the connection portion 22) so that the outward input f1' becomes larger than a removal load to detach the first arm member 16 from the bush 20 at the connection portion 22.

In the meantime, in a normal time in which no collision occurs, the second arm member 18 does not abut (make contact) with the projection portion 36A. Accordingly, due to the fulcrum distance L before collision, which is larger than the fulcrum distance L' after collision, the outward input f1 applied to the connection portion 22 as the front-side connection portion can be smaller than the removal load. Accordingly, when the removal load is determined on the assumption that the vehicle runs on a rough road or the like, it is possible for the vehicle to run by appropriately operating the suspension of the vehicle via the lower arm 12 having the first arm member 16 and the second arm member 18, without detachment of the first arm member 16 from the bush 20 at the connection portion 22 in the normal time.

Further, it is possible to immediately detach the first arm member 16 from the bush 20 at the connection portion 22 as the front-side connection portion by restraining the deformation amount, that is, it is possible to immediately separate the first arm member 16 from the bush 20 along with the occurrence of the collision. In view of this, as illustrated in FIG. 7, in comparison with a locus of a wheel assembly 124 (a front wheel) toward a vehicle outer side and a vehicle rear side in a case of employing the vehicle front structure 110 for a vehicle according to the related art, in a case where the vehicle front structure 10 for a vehicle according to the present embodiment is employed, the first arm member 16 is immediately detached from the suspension member 14 (the suspension member side rail 36) along with the collision, so that a locus of the wheel assembly 24 (the front wheel) is distanced more outwardly in the vehicle width direction around the connection portion 28 as the rear-side connection portion and is moved backward in the vehicle front-rear direction.

Figure 7:
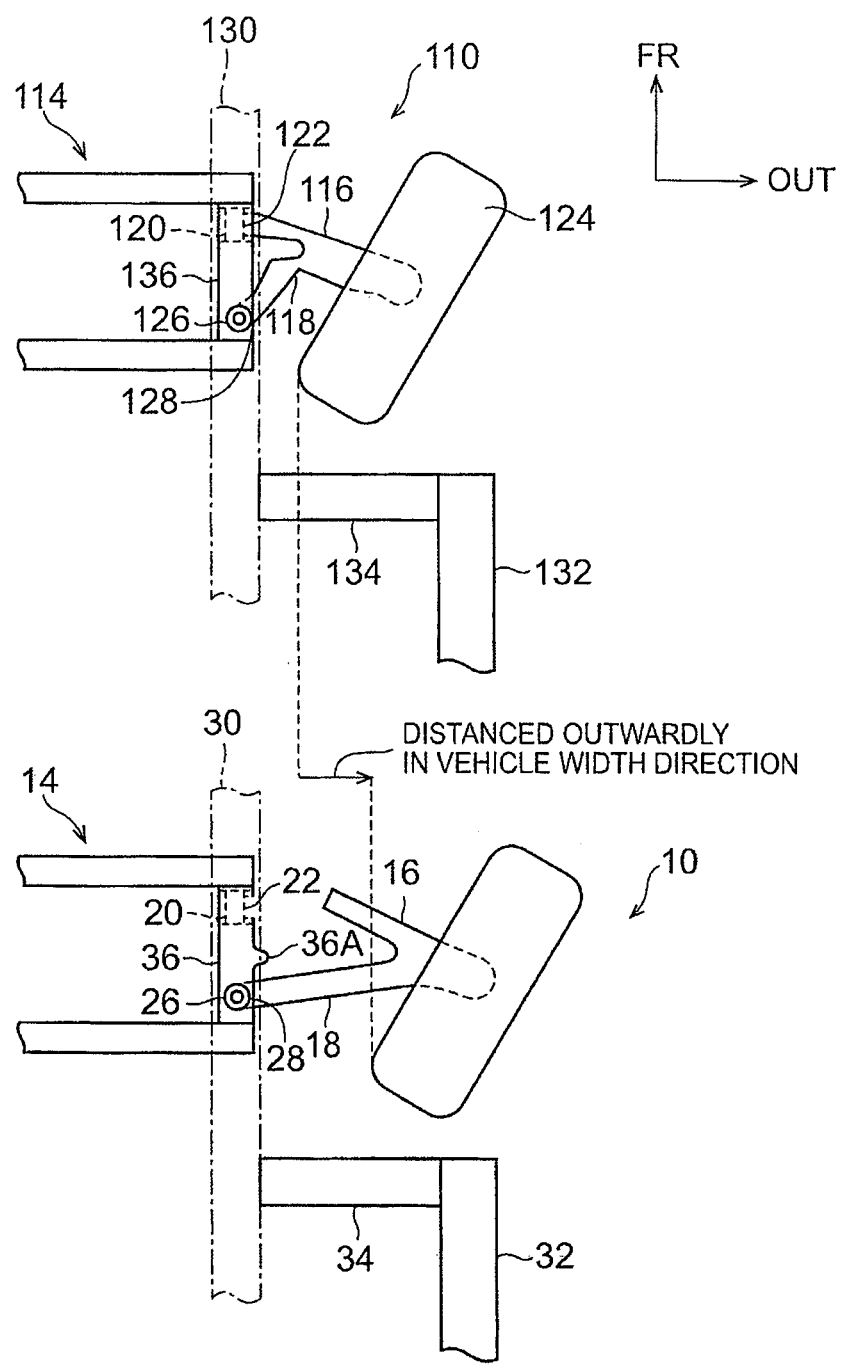
FIG. 7 is a view to describe a locus of a wheel assembly that is moved backward.

Hereby, as illustrated in FIG. 7, in a case of employing the vehicle front structure 10 for a vehicle according to the present embodiment, it is possible to more proactively cause the wheel assembly 24 (the front wheel) thus moved backward to abut with a vicinal area to an end face of the rigid rocker 32 extended in the vehicle front-rear direction, in comparison with a case of employing the vehicle front structure 110 for a vehicle according to the related art. Accordingly, for example, even in a state where the wheel assembly 24 (the front wheel) is moved backward vigorously due to a short overlap collision, the first arm member 16 is detached from the bush 20 at the connection portion 22 as the front-side connection portion (or the connection portion 22 is detached from the suspension member 14 (the suspension member side rail 36)), so that the wheel assembly 24 (the front wheel) can be moved backward so as to be distanced more outwardly in the vehicle width direction, before the wheel assembly 24 (the front wheel) abuts with the passenger compartment (more specifically, each member constituting the passenger compartment), which is a vehicle body portion placed behind the wheel assembly 24 (the front wheel). Further, the wheel assembly 24 (the front wheel) thus moved backward abuts with the rigid rocker 32 in a proactive manner, thereby making it possible to effectively prevent the wheel assembly 24 (the front wheel) from penetrating into the passenger compartment of the vehicle, which is the vehicle body portion. Hereby, even if a short overlap collision occurs, it is possible to protect an occupant in the vehicle appropriately.

<First Modification>

In the above embodiment, the projection portion 36A as the abutment member is formed integrally with the suspension member side rail 36 constituting the suspension member 14, and when the second arm member 18 constituting the lower arm 12 is deformed along with a collision caused in the front portion of the vehicle, the second arm member 18 abuts with the projection portion 36A. Hereby, in a state where the wheel assembly 24 (the front wheel) is moved backward due to the collision caused in the front portion of the vehicle, it is possible to increase the outward input applied to the connection portion 22 as the front-side connection portion so that the outward input becomes larger than the removal load, thereby allowing the first arm member 16 to be immediately detached from the suspension member 14 so that the wheel assembly 24 (the front wheel) can be distanced more outwardly in the vehicle width direction.

In this case, instead of forming the projection portion 36A in the suspension member side rail 36 constituting the suspension member 14, an abutment member may be formed in the second arm member 18 that is deformed inwardly in the vehicle width direction, that is, toward the suspension member 14 as the vehicle-body side member due to an input along with a collision. The following describes the first modification more specifically.

Figure 8:
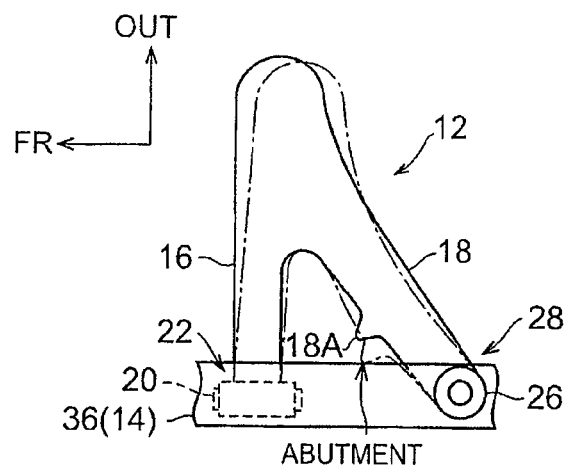
FIG. 8 is a view to describe a vehicle front structure for a vehicle according to a first modification of the present embodiment.

In the first modification, as illustrated in FIG. 8, a projection portion 18A projecting toward a suspension member 14 (more specifically, a suspension member side rail 36) as a vehicle-body side member is formed integrally with a second arm member 18 so that the projection portion 18A is placed in vicinity to a connection portion 28. Thus, even in a case where the projection portion 18A as the abutment member is formed integrally with the second arm member 18, it is possible to appropriately restrain the deformation of the second arm member 18 due to an input along with a collision, similarly to the above embodiment, thereby making it possible to increase that outward input to a first arm member 16 which is caused due to the input along with the collision.

More specifically, in the vehicle front structure 10 for a vehicle according to the first modification, the projection portion 18A projecting toward the suspension member 14 (the suspension member side rail 36) is formed in the second arm member 18 so as to be placed in vicinity to the connection portion 28. In view of this, similarly to the above embodiment, when the second arm member 18 starts deforming inwardly in the vehicle width direction due to an input along with a collision, the projection portion 18A formed in the second arm member 18 abuts with the suspension member 14 (the suspension member side rail 36) at an early stage of the deformation start as illustrated by an alternate long and short dash line in FIG. 8, and a further deformation of the second arm member 18 is restrained. That is, even in the vehicle front structure 10 for a vehicle according to the first modification, it is possible to restrain a deformation amount of the second arm member 18 due to the input along with the collision as appropriate.

Further, even in the vehicle front structure 10 for a vehicle according to the first modification, it is possible to place the projection portion 18A formed in the second arm member 18, between a connection portion 22 of the first arm member 16 and the connection portion 28 of the second arm member 18. Hereby, similarly to the above embodiment, it is possible to shorten the fulcrum distance L' after collision as compared to the fulcrum distance L before collision. Accordingly, even in the vehicle front structure 10 for a vehicle according to the first modification, the projection portion 18A of the second arm member 18 abuts with the suspension member 14 (the suspension member side rail 36) before the first arm member 16 is detached from the connection portion 22 as the front-side connection portion, thereby making it possible to increase the outward input f1' after the collision more than the outward input f1 before the collision according to the ratio of (L/L'), according to Formula 1 and Formula 3. Hereby, even in the first modification, in a state where the input F along with the collision is transmitted to a point of effort when the collision occurs, the projection portion 18A is able to increase the outward input f1' to the first arm member 16 (that is, the connection portion 22) so that the outward input f1' becomes larger than the removal load to detach the first arm member 16 from the bush 20 at the connection portion 22.

Further, even in the vehicle front structure 10 for a vehicle according to the first modification, it is possible to immediately detach the first arm member 16 at the connection portion 22 as the front-side connection portion by restraining a deformation amount of the second arm member 18, that is, it is possible to immediately separate the first arm member 16 from the bush 20 along with the occurrence of the collision. Accordingly, similarly to the above embodiment, even in a state where a wheel assembly 24 (a front wheel) is moved backward vigorously due to a short overlap collision, for example, it is possible to move the wheel assembly 24 (the front wheel) backward while distancing the wheel assembly 24 (the front wheel) outwardly in the vehicle width direction. Further, the wheel assembly 24 (the front wheel) thus moved backward abuts with a rocker 32 in a proactive manner, thereby making it possible to effectively prevent the wheel assembly 24 (the front wheel) from penetrating into a passenger compartment of the vehicle. Hereby, even in the vehicle front structure 10 for a vehicle according to the first modification, it is possible to protect an occupant in the vehicle appropriately.

<Second Modification>

In the above embodiment, the projection portion 36A as the abutment member is formed integrally with the suspension member side rail 36 constituting the suspension member 14. Further, in the first modification, the projection portion 18A as the abutment member is formed integrally with the second arm member 18. Instead of forming the projection portion 36A integrally with the suspension member side rail 36, and instead of forming the projection portion 18A integrally with the second arm member 18 as such, an abutment member may be provided such that, when the second arm member 18 is deformed inwardly in the vehicle width direction due to an input along with a collision, the abutment member is sandwiched between the second arm member 18 thus deformed and the suspension member 14 (the suspension member side rail 36). The following describes the second modification more specifically.

Figure 9:
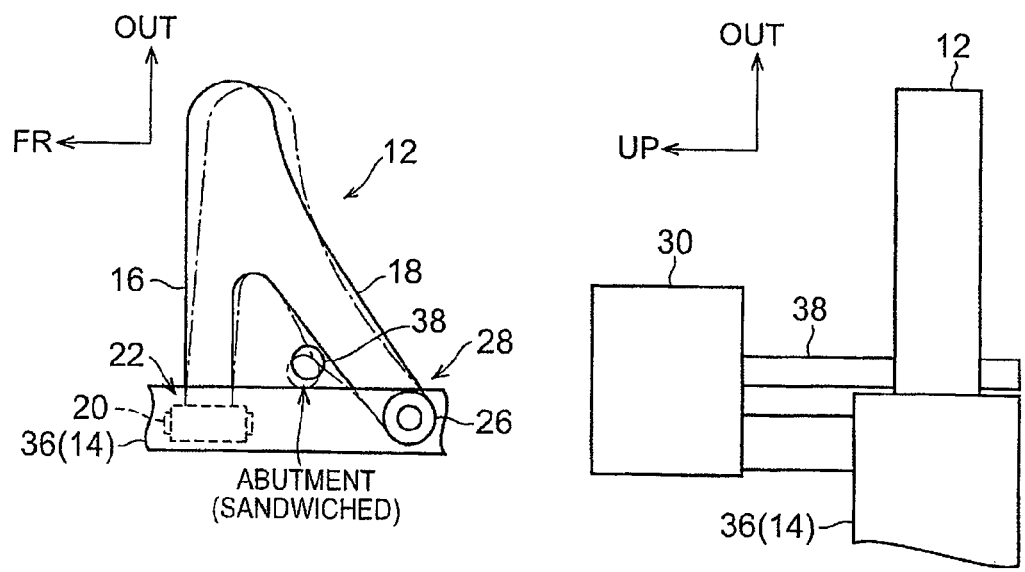
FIG. 9 is a view to describe a vehicle front structure for a vehicle according to a second modification of the present embodiment.

In the second modification, as illustrated in FIG. 9, a bar member 38 extended in the vehicle up-down direction is provided as an abutment member in a front side member 30. The bar member 38 is a solid bar, and is placed between a connection portion 22 (a bush 20) of a first arm member 16 as a front-side connection portion and a connection portion 28 (a bush 26) of a second arm member 18 as a rear-side connection portion. That is, the bar member 38 is provided in a space surrounded by the first arm member 16, the second arm member 18, and a suspension member side rail 36. Even in a case where the bar member 38 is provided in the space surrounded by the first arm member 16, the second arm member 18, and the suspension member side rail 36 as such, it is possible to appropriately restrain that deformation of the second arm member 18 which is caused due to an input along with a collision, similarly to the above embodiment and the first modification, thereby making it possible to increase that outward input to the first arm member 16 which is caused due to the input along with the collision.

More specifically, in the vehicle front structure 10 for a vehicle according to the second modification, the bar member 38 is assembled to the front side member 30 in vicinity to the connection portion 28 of the second arm member 18 so that the bar member 38 is sandwiched between the second arm member 18 and the suspension member 14 (the suspension member side rail 36). Accordingly, similarly to the above embodiment and the first modification, when the second arm member 18 starts deforming inwardly in the vehicle width direction due to an input along with a collision, the second arm member 18 abuts with the bar member 38, aid then, the bar member 38 is pushed toward the suspension member side rail 36 along with the deformation of the second arm member 18. Eventually, the bar member 38 is sandwiched between the second arm member 18 and the suspension member side rail 36. Thus, when the bar member 38 is sandwiched between the second arm member 18 and the suspension member side rail 36, a further deformation of the second arm member 18 is restrained. That is, even in the vehicle front structure 10 for a vehicle according to the second modification, it is possible to restrain a deformation amount of the second arm member 18 due to the input along with the collision as appropriate.

Further, in the vehicle front structure 10 for a vehicle according to the second modification, it is possible to place the bar member 38 between the connection portion 22 of the first arm member 16 and the connection portion 28 of the second arm member 18 in the space surrounded by the first arm member 16, the second arm member 18, and the suspension member side rail 36. Hereby, similarly to the above embodiment and the first modification, it is possible to shorten the fulcrum distance L' after collision as compared to the fulcrum distance L before collision. Accordingly, even in the vehicle front structure 10 for a vehicle according to the second modification, the second arm member 18 abuts with the suspension member 14 (the suspension member side rail 36) and the bar member 38 before starting of detachment of the first arm member 16 at the connection portion 22 as the front-side connection portion, thereby making it possible to increase the outward input f1' after the collision more than the outward input f1 before the collision according to the ratio of (L/L'), according to Formula 1 and Formula 3. Hereby, even in the second modification, in a state where the input F along with the collision is transmitted to a point of effort when the collision occurs, the bar member 38 is able to increase the outward input f1' to the first arm member 16 (that is, the connection portion 22) so that the outward input f1' becomes larger than the removal load to detach the first arm member 16 from the bush 20 at the connection portion 22.

Further, even in the vehicle front structure 10 for a vehicle according to the second modification, it is possible to immediately detach the first arm member 16 at the connection portion 22 as the front-side connection portion by restraining the deformation amount of the second arm member 18, that is, it is possible to immediately separate the first arm member 16 from the bush 20 along with the occurrence of the collision. Accordingly, similarly to the above embodiment and the first modification, even in a state where a wheel assembly 24 (a front wheel) is moved backward vigorously due to a short overlap collision, for example, it is possible to move the wheel assembly 24 (the front wheel) backward while distancing the wheel assembly 24 (the front wheel) outwardly in the vehicle width direction, and it is also possible to cause the wheel assembly 24 (the front wheel) thus moved backward to abut with a rocker 32 in a proactive manner. Hereby, even in the vehicle front structure 10 for a vehicle according to the second modification, it is possible to protect an occupant in the vehicle appropriately.

<Third Modification>

In the above embodiment and the first and second modifications, the second arm member 18 constituting the lower arm 12 is deformed inwardly in the vehicle width direction due to an input along with a collision. Further, the projection portion 36A, the projection portion 18A, or the bar member 38 and the suspension member 14 (the suspension member side rail 36) abut with the second arm member 18 thus deformed, so as to restrain the deformation amount of the second arm member 18. However, generally, the deformation easily occurs in a position where a resistance against the deformation is smaller than the other parts, that is, in a weakest part (a weakest position), and further, the deformation amount increases in such a part. In view of this, in the third modification, the deformation amount in the weakest part of the second arm member 18 is restrained preferentially, and an outward input caused due to an input along with a collision is increased immediately. The following describes the third modification more specifically.

Figure 10:
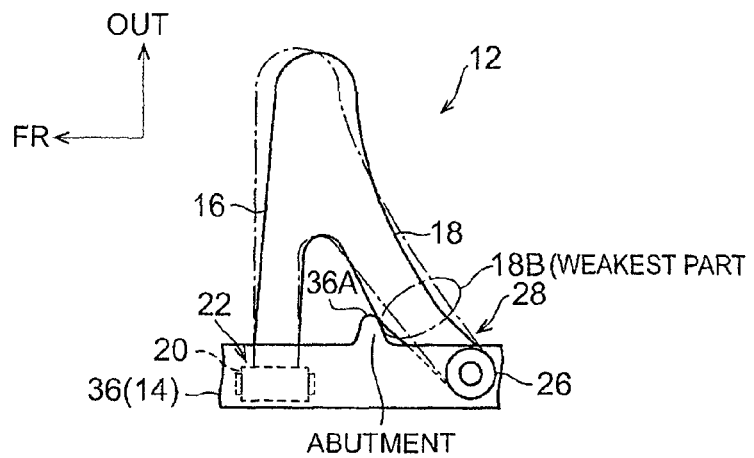
FIG. 10 is a view to describe a vehicle front structure for a vehicle according to a third modification of the present embodiment.

In a second arm member 18 having a curved shape that bends from inside toward outside in the vehicle width direction, an arc portion that projects inwardly in the vehicle width direction could be a weakest part that is easy to deform due to an input along with a collision, as illustrated in FIG. 10. In view of this, in the third modification, a projection portion 36A is formed in a suspension member 14 (a suspension member side rail 36) in a position where the projection portion 36A abuts with a deformed part (that is, a weakest part) of the second arm member 18 at the time when a weakest part 18B of the second arm member 18 is deformed, as illustrated in FIG. 10. As such, since the projection portion 36A is formed in a position corresponding to the weakest part 18B of the second arm member 18, when the weakest part 18B of the second arm member 18 starts deforming inwardly in the vehicle width direction due to an input along with a collision, the projection portion 36A formed in the suspension member side rail 36 abuts with the deformed part of the second arm member 18 at an early stage of starting of the deformation, so that its further deformation is surely restrained. That is, in the vehicle front structure 10 for a vehicle according to the third modification, it is possible to surely restrain the deformation (the deformation amount) of the second arm member 18 due to an input along with a collision.

Further, even in the vehicle front structure 10 for a vehicle according to the third modification, it is possible to place the projection portion 36A formed in the suspension member side rail 36, between a connection portion 22 of a first arm member 16 and a connection portion 28 of the second arm member 18. Accordingly, similarly to the above embodiment and the modifications, it is possible to shorten the fulcrum distance L' after collision as compared to the fulcrum distance L before collision, thereby making it possible to increase the outward input f1' after the collision more than the outward input f1 before the collision according to the ratio of (L/L'). Hereby, even in the third modification, in a state where the input F along with the collision is transmitted to a point of effort when the collision occurs, the projection portion 36A is able to increase the outward input f1' to the first arm member 16 (that is, the connection portion 22) so that the outward input f1' becomes larger than the removal load to detach the first arm member 16 from a bush 20 at the connection portion 22.

Further, even in the vehicle front structure 10 for a vehicle according to the third modification, it is possible to immediately detach the first arm member 16 from the bush 20 at the connection portion 22 as the front-side connection portion by surely restraining the deformation amount of the second arm member 18, that is, it is possible to immediately separate the first arm member 16 from the bush 20 along with the occurrence of the collision. Accordingly, similarly to the above embodiment and the modifications, even in a state where a wheel assembly 24 (a front wheel) is moved backward vigorously due to a short overlap collision, for example, the deformation amount of the second arm member 18 is restrained, so that it is possible to move the wheel assembly 24 (the front wheel) backward while more surely distancing the wheel assembly 24 (the front wheel) outwardly in the vehicle width direction, thereby resulting in that it is possible to cause the wheel assembly 24 (the front wheel) thus moved backward to abut with a rocker 32 in a more proactive manner. This makes it possible to effectively prevent the wheel assembly 24 (the front wheel) from penetrating into a passenger compartment of the vehicle, and to project an occupant of the vehicle appropriately.

The present invention is not limited to the above embodiment and the modifications, and various alterations can be made within a range that does not deviate from the object of the present invention.

For example, in the above embodiment and the modifications, the first arm member 16 constituting the lower arm 12 is extended in the vehicle width direction and connects the suspension member 14 to the wheel assembly 24 (the front wheel), and the second arm member 18 constituting the lower arm 12 is formed in a curved shape so that the second arm member 18 bends from inside toward outside in the vehicle width direction and connects the first arm member 16 to the suspension member 14. Further, in the above embodiment and the modifications, when the second arm member 18 is deformed (bent) inwardly in the vehicle width direction due to an input along with a collision, the second arm member 18 abuts with the projection portions 36A, 18A, and the bar member 38, which are abutment members. In this case, the first arm member 16 and the second arm member 18 that are connected to each other by being adhered (joined) to each other so as to constitute the lower arm 12 may be bent so that at least at their connecting part is placed on an outer side in the vehicle width direction relative to a vehicle-front-rear line that connects the connection portion 22 of the first arm member 16 to the connection portion 28 of the second arm member 18.

Figure 11:
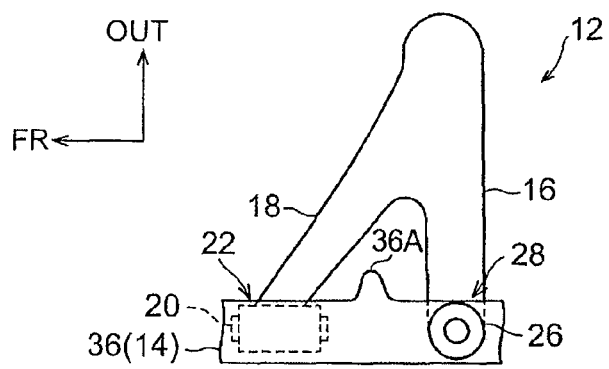
FIG. 11 is a view to describe a lower arm obtained by modifying a placement of the first arm member and a second arm member constituting the lower arm of FIG. 1.

More specifically, as illustrated in FIG. 11, for example, a second arm member 18 provided on a rear side relative to a first arm member 16 in the vehicle front-rear direction may be extended in the vehicle width direction so as to connect a suspension member 14 and a wheel assembly 24 (a front wheel), and the first arm member 16 may be integrally adhered (joined) to the second arm member 18 on a front side in the vehicle front-rear direction and also connected to the suspension member 14. In this case, when the second arm member 18 connected to the suspension member 14 via the bush 26 is moved backward in the vehicle front-rear direction due to an input along with a collision, the first arm member 16 abuts with a projection portion 36A formed integrally with the suspension member side rail 36 constituting the suspension member 14 (more specifically, the suspension member side rail 36).

Accordingly, similarly to the above embodiment and the modifications, the projection portion 36A is able to increase the outward input applied outwardly to the first arm member 16 (that is, a connection portion 22 as a front-side connection portion) in the vehicle width direction so that the outward input becomes larger than the removal load. Note that, in this case, similarly to the first modification, a projection portion projecting toward the suspension member 14 (more specifically, the suspension member side rail 36) as the vehicle-body side member may be formed integrally with the first arm member 16 so that the projection portion is placed in vicinity to the connection portion 22.

Figure 12:
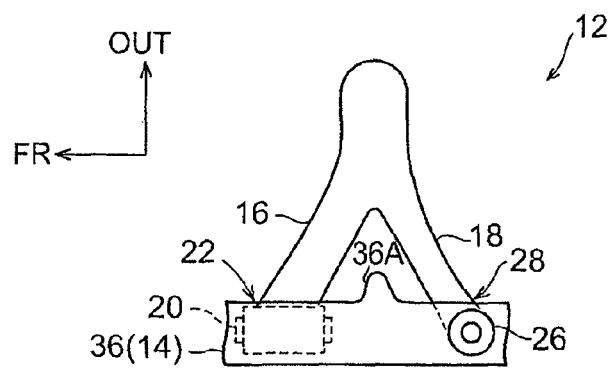
FIG. 12 is a view to describe a lower arm obtained by modifying a placement of the first arm member and the second arm member constituting the lower arm of FIG. 1.

Further, in this case, as illustrated in FIG. 12, for example, a first arm member 16 may be placed from a front side toward a rear side in the vehicle front-rear direction so as to connect a suspension member 14 and a wheel assembly 24 (a front wheel), and a second arm member 18 may be placed from the rear side toward the front side in the vehicle front-rear direction so as to be integrally adhered (joined) to the first arm member 16 and also connected to the suspension member 14. In this case, at least one of the first arm member 16 and the second arm member 18 is deformed inwardly in the vehicle width direction due to an input along with a collision, so as to abut with a projection portion 36A formed in a suspension member side rail 36.

Accordingly, similarly to the above embodiment and the modifications, it is possible for the projection portion 36A to increase the outward input applied outwardly to the first arm member 16 (that is, a connection portion 22 as a front-side connection portion) in the vehicle width direction so that the outward input becomes larger than the removal load. Note that, in this case, similarly to the first modification, a projection portion 18A projecting toward the suspension member 14 (more specifically, the suspension member side rail 36) as the vehicle-body side member may be formed in the second arm member 18 so that the projection portion 18A is placed in vicinity to a connection portion 28, or a projection portion projecting toward the suspension member 14 (more specifically, the suspension member side rail 36) as the vehicle-body side member may be formed integrally with the first arm member 16 so that the projection portion is placed in vicinity to the connection portion 22.

Further, instead of providing either one of the projection portion 36A, the projection portion 18A, and the bar member 38 as the abutment member, two or more of the projection portion 36A, the projection portion 18A, and the bar member 38 may be used in combination, for example. That is, in this case, the projection portion 36A may be formed in the suspension member side rail 36, and the projection portion 18A may be formed in the second arm member 18 in a position where the projection portion 18A abuts with the projection portion 36A. This makes it possible to cause the projection portion 36A and the projection portion 18A to abut with each other right after the second arm member 18 starts deforming due to an input along with a collision, thereby making it possible to restrain the deformation amount of the second arm member 18 to be small and to increase the outward input applied to the first arm member 16 to become larger than the removal load immediately.

Further, the above embodiment and the modifications deal with a case where the second arm member 18 integrally adhered (joined) to the first arm member 16 is deformed inwardly in the vehicle width direction due to an input along with a collision. In this case, if the second arm member 18 is deformed outwardly in the vehicle width direction due to an input along with a collision and/or is moved backward in the vehicle front-rear direction due to the bush 26 constituting the connection portion 28, the first arm member 16 abuts with the projection portion 36A formed in the suspension member 14 (more specifically, the suspension member side rail 36) before the separation of the first arm member 16 occurs at the connection portion 22. Accordingly, similarly to the above embodiment, the projection portion 36A is able to increase the outward input applied to the first arm member 16 due to an input along with a collision, so that the outward input becomes larger than the removal load.

Further, in the above embodiment and the modifications, the suspension member 14 (more specifically, the suspension member side rail 36) is employed as the vehicle-body side member. In this case, the front side member 30 constituting a vehicle body may be employed as the vehicle-body side member. In this case, the lower arm 12, namely, the first arm member 16 and the second arm member 18 are connected to the front side member 30 via the connection portion 22 (the bush 20) and the connection portion 28 (the bush 26), respectively. In this case, by forming a projection portion as the abutment member in the front side member 30 so that the projection portion is placed between the connection portion 22 and the connection portion 28, it is possible to obtain an effect similar to the above embodiment.

Further, the embodiment and the modifications deal with a case where the first arm member 16 is detached (separated) from the bush 20 at the connection portion 22 as the front-side connection portion. In this case, it goes without saying that the bush 20 constituting the front-side connection portion may be configured to separate from the suspension member 14 (the suspension member side rail 36) as the vehicle-body side member. Even in this case, it is possible to obtain effects similar to the above embodiment and the modifications.

Further, in the above embodiment and the modifications, the lower arm 12 formed by connecting the first arm member 16 to the second arm member 18 is employed so as to support the wheel assembly 24 (the front wheel). In this case, it goes without saying that a multilink-type suspension may be employed in which the first arm member 16 is connected to the suspension member 14 and also connected to the wheel assembly 24 (the front wheel) and the second arm member 18 is connected to the suspension member 14 and also connected to the wheel assembly 24 (the front wheel) so that the first arm member 16 and the second arm member 18 directly support the wheel assembly 24 (the front wheel). Even in this case, it is possible to obtain effects similar to the above embodiment and the modifications.

The invention claimed is:

1. A vehicle front structure for a vehicle comprising:
   a vehicle-body side member integrally assembled to a vehicle body of the vehicle;
   a first arm member connected to the vehicle-body side member, the first arm member supporting a wheel assembly of the vehicle;
   a second arm member connected to the vehicle-body side member, the second arm member supporting the wheel assembly of the vehicle;
   a front-side connection portion that is either one of a connection portion connecting the first arm member to the vehicle-body side member and a connection portion connecting the second arm member to the vehicle-body side member;
   a rear-side connection portion that is the other one of the connection portion for the first arm member and the connection portion for the second arm member, the rear-side connection portion being placed on a rear side in a vehicle front-rear direction relative to the front-side connection portion; and
   an abutment member being placed on a rear side, in the vehicle front-rear direction, relative to the front-side connection portion, the abutment member is placed on a front side, in the vehicle front-rear direction, relative to the rear-side connection portion, wherein when the abutment member abuts with the vehicle-body side member and at least that one of the first arm member and the second arm member which is deformed or moved backward in the vehicle front-rear direction due to an input from the wheel assembly along with a collision caused in a front portion of the vehicle, the abutment member detaches the front-side connection portion.

2. The vehicle front structure for the vehicle according to claim 1, wherein:
   when at least one of the first arm member and the second arm member is deformed or moved backward in the vehicle front-rear direction due to the input from the wheel assembly along with the collision caused in the front portion of the vehicle, the abutment member abuts with at least that one of the first arm member and the second arm member which is not detached from the vehicle-body side member;
   an outward input to the first arm member and the second arm member is larger than a removal load, the removal load detaching the first arm member or the second arm member from the vehicle-body side member at the front-side connection portion, the outward input being caused outwardly in a vehicle width direction due to the input from the wheel assembly; and the abutment member increases the outward input.

3. The vehicle front structure for the vehicle according to claim 2, wherein:
   before the wheel assembly abuts with a vehicle body portion placed behind the wheel assembly in the vehicle front-rear direction, the abutment member increases the outward input, the outward input becomes larger than the removal load; and
   the abutment member causes the first arm member or the second arm member to be detached from the vehicle-body side member at the front-side connection portion.

4. The vehicle front structure for the vehicle according to claim 2, wherein:
   when the abutment member increases the outward input and the outward input becomes larger than the removal load and the first arm member or the second arm member is detached from the vehicle-body side member at the front-side connection portion due to the outward input, the abutment member distances the wheel assembly outwardly in the vehicle width direction at least around the rear-side connection portion and the abutment member displaces the wheel assembly toward the rear side in the vehicle front-rear direction.

5. The vehicle front structure for the vehicle according claim 2, wherein:
   the removal load is a load to detach the first arm member or the second arm member from a fixing member, the fixing member integrally fixed to the vehicle-body side member, the fixing member constituting the front-side connection portion, the first arm member integrally adhered to the fixing member, the second arm member integrally adhered to the fixing member.

6. The vehicle front structure for the vehicle according to claim 5, wherein:
   the fixing member is a bush having a central axis along the vehicle front-rear direction, the bush allowing the first arm member or the second arm member to be displaced in a rotating manner in a vehicle up-down direction around the central axis; and
   the removal load is a load to detach the first arm member or the second arm member from the bush, the bush integrally fixed to the vehicle-body side member, the first arm member integrally adhered to the bush, the second arm member integrally adhered to the bush.

7. The vehicle front structure for the vehicle according to claim 2, wherein:
   when an input from the wheel assembly along with the collision caused in the front portion of the vehicle is assumed F, a rigidity of the front-side connection portion with respect to the input F is assumed K1, a rigidity of the rear-side connection portion with respect to the input F is assumed K2, a rigidity of the abutment member with respect to the input F is assumed K3, a distance between the front-side connection portion and the rear-side connection portion is assumed L, a distance from a point of load to a point of effort to which an input along with a collision is transmitted is W, and a distance between the front-side connection portion and the abutment member is assumed L', an outward input f1 is represented by a following formula:

$$f1=(K1\times(L\times K2+L'\times K3)\times W\times F)/((L-L')^2\times K2\times K3+L^2\times K1\times K3+L^2\times K1\times K2)).$$

8. The vehicle front structure for the vehicle according to claim 1, wherein:
the abutment member is provided in a position where at least one of the first arm member and the second arm member is deformed inwardly in a vehicle width direction along with the collision.

9. The vehicle front structure for the vehicle according to claim 8, wherein:
the position where at least one of the first arm member and the second arm member is deformed inwardly in the vehicle width direction is a position where a resistance against the deformation is smaller than that in the other parts.

10. The vehicle front structure for the vehicle according to claim 1, wherein:
the second arm member is connected to the vehicle-body side member and also connected to the first arm member.

11. The vehicle front structure for the vehicle according to claim 1, wherein:
the abutment member is a projection portion formed integrally with at least one of the first arm member, the second arm member, and the vehicle-body side member.

12. The vehicle front structure for the vehicle according to claim 1, wherein:
the abutment member is placed between the vehicle-body side member and at least one of the first arm member and the second arm member, the abutment member being integrally assembled to the vehicle-body side member; and
the abutment member is sandwiched between the vehicle-body side member and the at least one of the first arm member and the second arm member.

13. The vehicle front structure for the vehicle according to claim 11, wherein:
the vehicle-body side member and at least one of the first arm member and the second arm member abut with the abutment member at the same height in a vehicle up-down direction.

14. The vehicle front structure for the vehicle according to claim 1, wherein:
the vehicle-body side member is a front side member constituting the vehicle body or a suspension member integrally adhered to the front side member, the suspension member supporting a suspension including the first arm member and the second arm member.

15. A vehicle front structure for a vehicle comprising:
a vehicle-body side member integrally assembled to a vehicle body of the vehicle;
a first arm member connected to the vehicle-body side member, the first arm member supporting a wheel assembly of the vehicle;
a second arm member connected to the vehicle-body side member, the second arm member supporting the wheel assembly of the vehicle;
a front-side connection portion that is either one of a connection portion connecting the first arm member to the vehicle-body side member and a connection portion connecting the second arm member to the vehicle-body side member;
a rear-side connection portion that is the other one of the connection portion for the first arm member and the connection portion for the second arm member, the rear-side connection portion being placed on a rear side in a vehicle front-rear direction relative to the front-side connection portion; and
a projection portion being placed on a rear side, in the vehicle front-rear direction, relative to the front-side connection portion, the projection portion is placed on a front side, in the vehicle front-rear direction, relative to the rear-side connection portion, the projection portion being provided in at least one of the first arm member, the second arm member, and the vehicle-body side member, when the projection portion abuts with the vehicle-body side member and at least one of the first arm member and the second arm member the projection portion detaches the front-side connection portion, wherein:
the at least one of the first arm member, the second arm member, and the vehicle-body side member is opposed to the projection portion at the same height in a vehicle up-down direction so as to abut with the projection portion.

* * * * *